US011763038B2

(12) United States Patent
Kalaboukis et al.

(10) Patent No.: US 11,763,038 B2
(45) Date of Patent: Sep. 19, 2023

(54) SECURED FILE STORAGE (71) Applicant: Wells Fargo Bank, N.A., San Francisco, CA (US)

(72) Inventors: Chris Theodore Kalaboukis, San Jose, CA (US); Joon Maeng, Newcastle, WA (US); Ramanathan Ramanathan, Bellevue, WA (US); Abhijit Rao, Irvine, CA (US); Abhijit Shetti, Pleasanton, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 307 days.

(21) Appl. No.: 16/858,115

(22) Filed: Apr. 24, 2020

(65) Prior Publication Data
US 2021/0334412 A1    Oct. 28, 2021

(51) Int. Cl.
    *G06F 21/78*    (2013.01)
    *G06F 16/182*   (2019.01)

(52) U.S. Cl.
    CPC ............ *G06F 21/78* (2013.01); *G06F 16/182* (2019.01); *G06F 2221/2107* (2013.01)

(58) Field of Classification Search
    CPC ......... G06F 2221/2107; G06F 21/6218; G06F 21/78; G06F 3/067; G06F 3/0683
    See application file for complete search history.

(56) References Cited

U.S. PATENT DOCUMENTS

| | | | |
|---|---|---|---|
| 10,924,548 B1* | 2/2021 | Karumbunathan | .......................... H04L 67/1097 |
| 10,984,116 B2* | 4/2021 | Lewis | ................... H04L 63/083 |
| 2013/0301830 A1 | 11/2013 | Bar-El et al. | |
| 2016/0080326 A1 | 3/2016 | Brand | |
| 2017/0193233 A1* | 7/2017 | Lorini | ................... H04L 63/062 |
| 2017/0257655 A1 | 9/2017 | Quentin | |
| 2017/0293766 A1* | 10/2017 | Schnjakin | ............. G06F 21/602 |
| 2017/0316390 A1 | 11/2017 | Smith et al. | |
| 2018/0005230 A1 | 1/2018 | Zovi et al. | |
| 2019/0164156 A1 | 5/2019 | Lindemann | |
| 2019/0205859 A1 | 7/2019 | Torres Da Silveira et al. | |
| 2020/0250327 A1* | 8/2020 | Naraidoo | ............ G06F 11/1464 |
| 2020/0319971 A1* | 10/2020 | Hegde | .................. G06F 21/6227 |
| 2021/0056218 A1* | 2/2021 | Kurian | .................. G06F 21/602 |
| 2021/0256147 A1* | 8/2021 | Gupta | ..................... G06F 21/57 |

FOREIGN PATENT DOCUMENTS

| | | | | |
|---|---|---|---|---|
| WO | WO-2019125182 A1 | | 6/2019 | |
| WO | WO-2020167254 A1 * | | 8/2020 | ......... G06F 21/6245 |

* cited by examiner

*Primary Examiner* — Daniel B Potratz
(74) *Attorney, Agent, or Firm* — SCHWEGMAN LUNDBERG & WOESSNER, P.A.

(57) ABSTRACT

Systems and methods may generally be used to securely store an executable file or to compile a securely stored executable file. An example method may include receiving an executable file for long-term storage, segmenting the executable file into a plurality of file segments, encrypting a file segment of the plurality of file segments, storing the plurality of file segments, and retrieving the file segment based on a segment identity for the file segment. The file segment may be output, for example to a requesting device.

19 Claims, 6 Drawing Sheets

SECURED FILE STORAGE

BACKGROUND

File storage has changed significantly over the last several years. The cloud has emerged as a type of storage, allowing for significantly more data to be stored than the days of single storage devices (e.g., CDs) and desktop computers. With the increase in data storage, access and long-term management of data has received more attention in recent years. The Health Insurance Portability and Accountability Act of 1996 (HIPAA), Truth in Lending Act, Bank Secrecy Act, and other governmental regulations require that data be both maintained over a period of time, as well as kept secure.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The systems and methods described herein provide for a secure storage of a file, such as an executable application. The systems and methods securely store the file by partitioning the file into two or more segments. The segments may be encrypted and stored. For example, each segment may be separately encrypted (with the same or different encryption techniques for each segment) and stored on memory devices (e.g., a server). The segments may be stored on separate memory devices or on a same memory device. In some examples, the segments may be stored more than once (e.g., on the same memory device or on separate memory devices), for example with one or more unique encryption techniques used to encrypt each segment. Two copies of a segment may be stored, for example on two memory devices, with each copy having a different encryption technique used to encrypt that copy.

Storage locations for generated segments may be mapped to identifiers of the segments, and optionally to encryption techniques for each stored segment. The map may be stored, such as at an interface device, such as a server in communication with a device uploading the file. Encrypted segments may be decrypted and re-encrypted with a different encryption technique in certain cases. Segments may be moved within a storage device or from one storage device to another. In either of these cases, the map may be updated to include the new encryption technique or the new location.

In an example, a device attempting to access the file may be required to know identifiers for all segments. All segments may be necessary to recompile the file, in some examples. In other examples, redundant segments may be generated (e.g., half overlapping segments, such that should any single segment be lost, no information is entirely lost). The recompiled file may be an executable application, which may be configured to only run within a secure environment.

Figure 1:
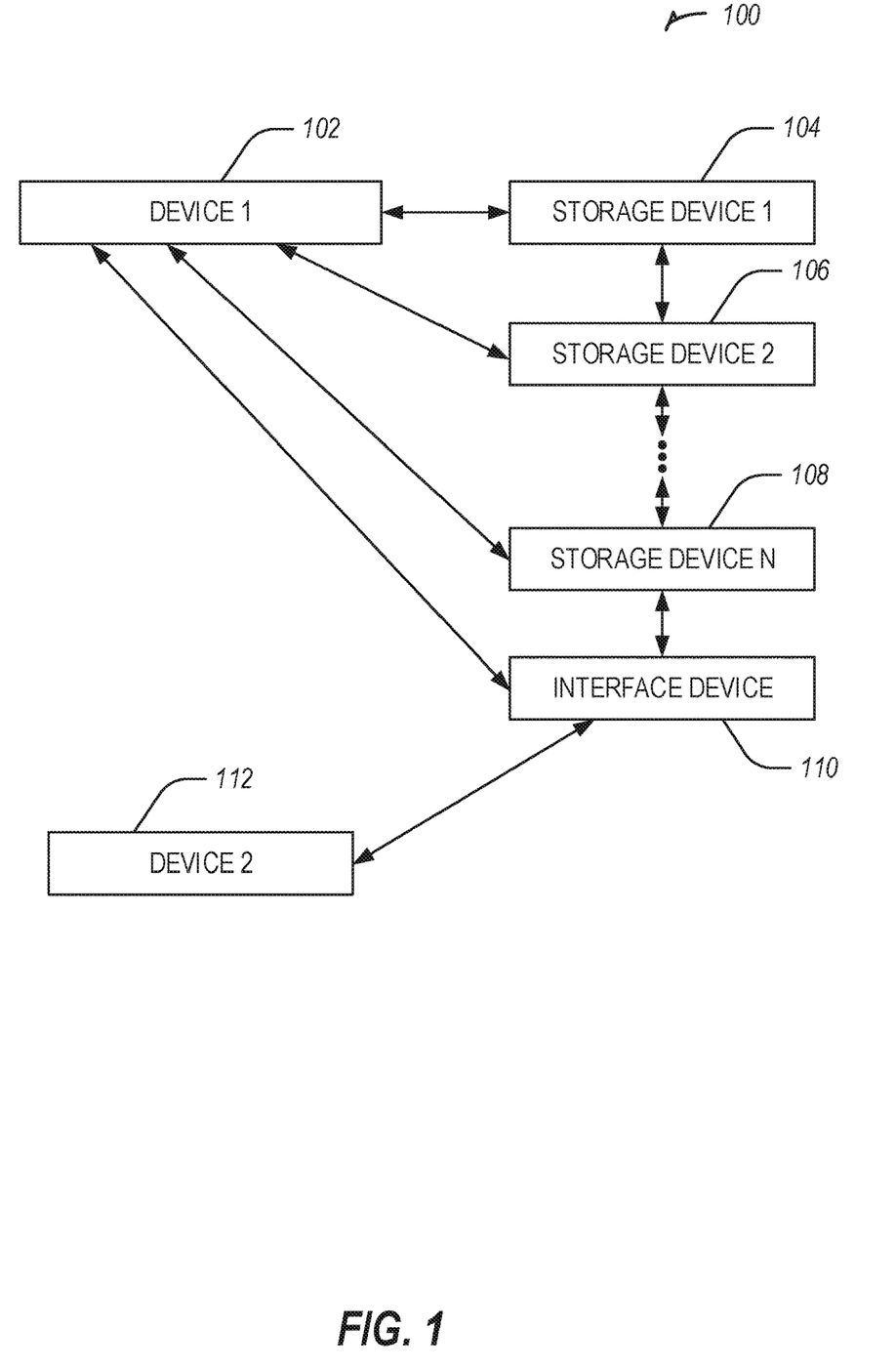
FIG. 1 illustrates a system for secure storage in accordance with some embodiments.

FIG. 1 illustrates a system 100 for secure storage in accordance with some embodiments. The system includes one or more storage devices (e.g., a first storage device 104) and an interface device 110, which in some examples may be one of the one or more storage devices (e.g., a single device may be the only storage device and the interface device). A device 102 may communicate with the interface device 110 or one of the one or more storage devices 102, 106, 108.

The device 102 may send a file (e.g., an executable application) to the interface device 110. The interface device 110 may generate a plurality of file segments from the file. The plurality of file segments may be stored at the one or more storage devices or at the interface device 110. In an example, the interface device 110 generates n segments, with each segment stored at least once at a corresponding storage device (e.g., segment 1 stored at least once on storage device 104, segment 2 stored at least once on storage device 106, segment n stored at least once on storage device 108, etc.). The segments may be encrypted before being stored. For example, each segment 1, 2, . . . n may be separately encrypted before storage. In an example, the encryption used for storing the segments is the same for each segment. In another example, different encryption types or parameters are used for different segments.

The segments may be stored more than once at a storage device. For example, two copies of a segment 1 may be stored at storage device 104 with a first copy of segment 1 encrypted with a first encryption technique and a second copy of segment 1 encrypted with a second encryption technique. In another example, the two copies may be stored on separate storage devices. For example, the first copy encrypted with the first technique may be stored on storage device 104 and the second copy encrypted with the second technique may be stored on storage device 106. Encryption techniques may vary by parameters (e.g., number of bits), by type (e.g., symmetric keys, asymmetric keys, one time pad, etc.), or the like.

In some examples, rather than the interface device 110 generating the plurality of file segments from a file, the device 102 may generate the plurality of file segments from a file (e.g., an executable application). In this example, the device 102 may send all of the plurality of file segments to the interface device 110. In another version of this example, the device 102 may send segments to respective storage devices where the segments are to be stored. For example, the device 102 may send a first segment to the storage device 104, second segment to storage device 106, etc. The device 102 may encrypt the segments before sending to the interface device 110 or to one or more of the storage devices, or the segments may be encrypted by the interface device 110 or at the one or more storage devices.

More than one segment may be stored on a single storage device (e.g., 104), according to an example. For example, a file split into three segments may have all three segments stored on storage device 104, one segment stored on storage device 104 and two segments stored on storage device 106, or one segment stored on each of storage device 104, 106, and 108.

Where a file is partitioned into segments, where a particular segment of the file is stored, and what encryption technique is used to encrypt any particular segment may be changed or specified for the file. For example, the device 102 or the interface device 110 may determine these details or information (e.g., location, ease of access, bandwidth, etc.) of the device 102 or the interface device 110) may be used to determine these details. In an example, these details may be determined based on attributes of the file, such as a use of the file, a field of the file, a frequency of access of the file, a size of the file, a file type of the file, or the like. For example, if the file is to be accessed frequently, the segments for the file may be stored on a single storage device. In other examples, a large file size may have multiple segments on a single storage device, a plain text file may be stored with stronger encryption (e.g., higher number of bits for encryption such as 256) and across more storage devices than an executable application, or the like. The use or field of the file may include banking, law enforcement, or the like, which may indicate a long term storage is needed. Long term storage may correspond to storing multiple copies of each segment of a file (or some segments of a file), for example using different encryption techniques. Length of storage examples are shown below in Table 1.

TABLE 1

Example Storage Lengths for Documents

| Document Type | Length to Store |
|---|---|
| Tax Info | 5-10 years |
| Mortgage | 20-50 years |
| Auto Loan | 5-10 years |
| Equal Credit Opportunity Act | 1-5 years |
| Truth in Lending Act | 1-5 years |
| Bank Secrecy Act | 3-10 years |
| FDIC Activities | Permanently |
| Personnel Management | 20-80 years |
| Legal Matters | 5-20 years |
| Judicial Matters | 10-30 years |
| Criminal Restitution | 10-30 years |

The interface device 110 may store a map of segment identifications (IDs) to segment storage locations. The map may be used to keep track of where each segment is stored. In an example, a storage location of the segment may change (e.g., from an initial storage location to a second storage location), within a storage device (e.g., a block, hit, etc.) or to another storage device. When the storage location changes, the map may be updated. The map may be used when a device requests access to a segment (e.g., the request may include a segment ID sent from a device to the interface device 110), to provide the segment to the requesting device. The interface device 110 may determine the storage location of the segment based on the ID. Thus, the requesting device does not need to know a current storage location, does not need to be updated when the storage location changes, etc., and the requesting device may retrieve the segment based on the ID. The interface device 110 may control changes to the map (e.g., notify a storage device to change location of a segment or to move a segment to a new storage device) or receive updates to storage locations of segments (e.g., from a storage device).

A device 112 may request access to the file. In an example, the device 102 may be the requesting device, but in other examples, a different device (e.g., 112) may be the requesting device. The device 112 may request access to the file by communicating with the interface device 110. In an example, the device 112 may be an intermediary device to another device requesting the file.

In response to the device 112 requesting the file, the interface device 110 may verify (or use another device or service to verify) that the device 112 has proper credentials or authority to access the file. In some cases, the device 112 may have credentials or authority to receive information about the file, but not receive the file itself (e.g., the file may be run at the interface device 110, a storage device, or other server or device, and an output may be provided to the device 112). In other cases, the device 112 may receive the file. In either case, the segments of the file may be retrieved and decrypted (at the interface device 110, the device 112, another device that the device 112 forwards the file to, at each storage device, for example individually decrypting a segment at its storage location, or the like).

The device 112 may receive the file, encrypted segments, or decrypted segments (or a combination of encrypted and decrypted segments) from the interface device 110. In an example, in order to receive all segments of the file or in order to receive the file itself, the device 112 may be required to identify storage locations for all of the segments. For example, the device 112 may request the file from the interface device 110, which may challenge the device 112 to provide storage locations for all segments. In another example, the device 112 may request a segment individually from the interface device 110 by identifying its location. In still another example, the device 112 may send a request for a segment directly to the storage device that the segment is stored on, and receive the segment (encrypted or decrypted) from that storage device. In yet another example, the device 112 may request segments by using segment identifiers, which may be sent to the interface device 110. In this example, the interface device may check a map with the segment identifiers and find corresponding storage locations for the segments.

The executable application that is segmented, encrypted, and stored may be used to initiate or complete a monetary transfer. This may be particularly useful for monetary transfers that are to take place in asynchronous time (e.g., not in real-time, with a delay, etc.). The executable application may be used to initiate a monetary transfer or other financial transaction using any of a myriad number of techniques. The technique used may depend on a country, state, or general location of the executing device, may depend on a transferor bank or a transferee bank, may depend on other apps or accounts available, configurations, or capabilities of the executing device, may depend on communication bandwidth of the executing device, or may depend on the type of transaction intended. For example, the executable application, when executed on the executing device, may initiate a communication with a bank to put in a transfer order, a wire, bank-to-bank transfer or the like. In another example, the executable application may send information to another app available on the executing device to complete a monetary transfer (e.g., via a digital wallet or P2P money transfer app). In examples where the transferor bank and the transferee bank are the same bank, the executable application may send a message to that bank to move money from one account to another. In an example, an executable application including an amount and information about a transferor account may be segmented, encrypted, and stored. A device may later be given segment identifiers, which allow the device to obtain the segments, decrypt them, and run the executable application, initiating the monetary transfer.

Figure 2:
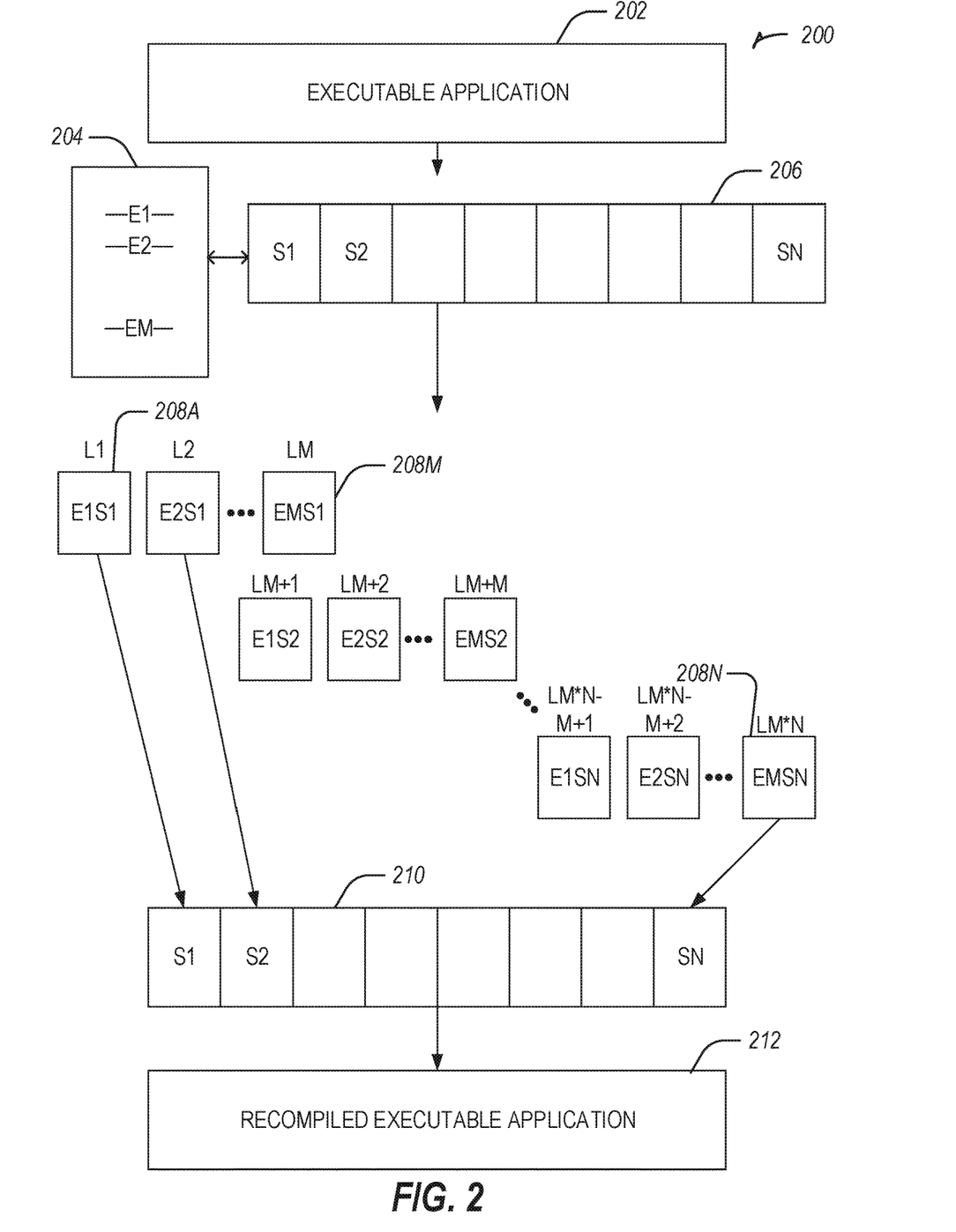
FIG. 2 illustrates a secured storage scheme in accordance with some embodiments.

FIG. 2 illustrates a secured storage scheme in accordance with some embodiments. FIG. 2 includes a series of snapshots showing an executable application 202 as it is segmented, encrypted, stored, re-segmented and decrypted (or decrypted and re-segmented), and recompiled as an executable application 212. Although FIG. 2 shows an executable application, other files may be segmented, encrypted, and stored as well. Further, while a plurality of segments including at least three segments are shown, as few as two segments may be used.

The snapshots shown in FIG. 2 start with an executable application 202, which may be generated by, identified by, or sent to a server or other device performing the segmentation. Each aspect of FIG. 2 may be performed by a single device or by multiple devices. The executable application 202 is partitioned into a plurality of segments 206 (e.g., two or more segments). One or more encryption techniques are identified (at encryption block 204). A single encryption technique may be used to encrypt all segments, each segment may have its own encryption technique, or any combination of any number of encryption techniques may be applied to any number of segments, including leaving one or more segments unencrypted.

In the example shown in FIG. 2, there are n segments 206 that are encrypted with m encryption techniques 204 to form encrypted segments (e.g., 208A . . . 208N). Again, a single encryption technique or some other number of encryption techniques may be used. For example, encrypted segment 208A is segment 1 encrypted with encryption technique 1, which may be stored at location L1. Further examples are shown in FIG. 2, including encrypted segment 208M, which is segment 1 encrypted with encryption technique m, and stored at location LM, through encrypted segment 208N, which is segment n, encrypted with encryption technique m, stored at location LM*N. Although these examples are shown with numerical locations, the locations do not need to be sequential, on the same device, or in order. Further, while the example of FIG. 2 shows each segment encrypted m times, some segments may be encrypted with fewer techniques or stored in fewer locations or encrypted with more techniques or stored in more locations. An encrypted segment may be stored in more than one location (e.g., even with the same encryption technique and same segment).

When a segment is requested for retrieval, it may be decrypted, using a decryption technique corresponding to the encryption technique used to store the segment. This may occur at the storage location or elsewhere. When all segments are decrypted, they may be assembled 210, and recompiled to generate the executable application 212. In another example, the segments may be assembled in encrypted form and decrypted all together (e.g., after recompiling the executable application). The encryption or decryption keys may be stored at an interface device, at a storage location, or elsewhere (e.g., which may be mapped).

Because the segments are stored individually, with one or more encryption techniques, an encrypted segment may be updated, for example with a new encryption technique. This may occur when a particular encryption technique used to encrypt a particular segment becomes broken, obsolete, or undesirable to continue using. For example, should encryption technique 1 become solvable and need to be replaced, each segment stored with that encryption technique 1 may be retrieved (e.g., from locations L1, LM+1, LM*N−M+1, etc.), decrypted, re-encrypted with a new encryption technique (e.g., a stronger technique with more bits, a newer technique, or a technique that is not broken), and stored again. The storage location for a particular segment re-encrypted in this manner may be the same as the original storage location or may be changed. In an example, from time to time a storage location may need to be changed (e.g., a server goes bad, general maintenance, equipment upgrades, changes in ownership, etc.). When the location is changed, the encryption technique used to store a segment may be checked and optionally upgraded or changed. In an example, the location may be compromised, and a segment stored at the location may change in response. The location may become compromised for example by corrupted memory, a moved server, an offline server, degraded memory, fraudulent access, a security breach, or the like.

Recall the map discussed above. The map may store a particular encryption technique along with a location and segment identifier (e.g., the map may store S1's identifier along with information about E1 and the location L1). Instead of the location, the map may store a link to the location, which may be updated when the location changes. In another example, the encryption technique used for a particular segment is stored with the segment at the location.

In an example, one or more of the segments may be stored using a homomorphic encryption technique. Homomorphic encryption allows for searching or other operations on encrypted files, bits, or segments that match results (when decrypted) as they would be performed on the unencrypted version of the files, bits, or segments. For example, consider a segment and a search term that, when searched unencrypted, results in the segment being identified. When the segment stored is using a homomorphic encryption technique, and the search term is encrypted using the same homomorphic encryption technique, the encrypted search term, when searched encrypted, identifies the encrypted segment. A homomorphic encryption technique for stored segments may be used without a map, for example when a search term may be used to identify each segment. For example, a device attempting to retrieve a segment may know a key (e.g., a number) in the cleartext of the segment (e.g., unencrypted). The device may provide the key (which may be encrypted at a server or interface device) or an encrypted version of the key to a server or interface device to search the encrypted segments for retrieving the segment.

Figure 3:
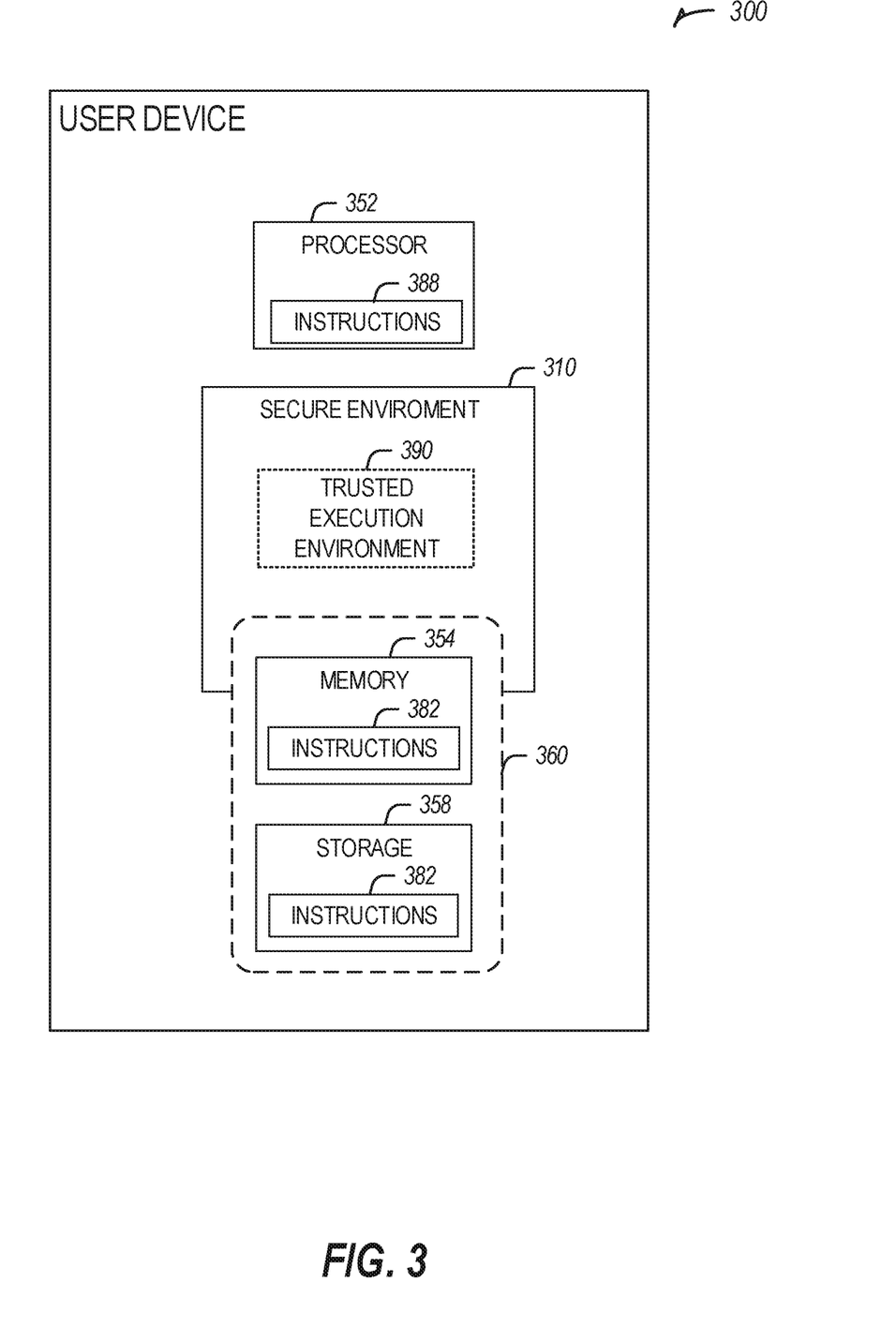
FIG. 3 illustrates a secure environment in accordance with some embodiments.

FIG. 3 illustrates a secure environment 310 in accordance with some embodiments. The secure environment 310 is illustrated on a user device 300, which may be a computer (e.g., a desktop or a laptop), a mobile device (e.g., a phone or tablet), a wearable device, or the like. The user device 300 includes a processor 352 configured to execute instructions 388, and various media, memory, or storage components. The user device 300 includes the secure environment 310, which may include a trusted execution environment 390 in an example.

The storage 358 or the memory 354 may include instructions 382 in the form of software, firmware, or hardware commands to implement the techniques described herein (e.g., via the processor 352). Although such instructions 382 are shown as code blocks included in the memory 354 and the storage 358, it may be understood that any of the code blocks may be replaced with hardwired circuits, for example, built into an application specific integrated circuit (ASIC).

In an example, the instructions 382 provided via the memory 354, the storage 358, or the processor 352 may be embodied as a non-transitory, machine readable medium 360 including code to direct the processor 352 to perform electronic operations in the user device 300. The processor 352 may access the non-transitory, machine readable medium 360. For instance, the non-transitory, machine readable medium 360 may be embodied by devices described for the storage 358 or may include specific storage units such as optical disks, flash drives, or any number of other hardware devices. The non-transitory, machine readable medium 360 may include instructions to direct the processor 352 to perform a specific sequence or flow of actions, for example, as described with respect to the flowchart(s) and block diagram(s) of operations and functionality depicted herein.

Also, in a specific example, the instructions 388 on the processor 352 (separately, or in combination with the instructions 388 of the machine readable medium 360) may configure execution or operation of a trusted execution environment (TEE) 390. In an example, the TEE 390 operates as a protected area accessible to the processor 352 for secure execution of instructions and secure access to data. Various implementations of the TEE 390, and an accompanying secure area in the processor 352 or the memory 354 may be provided, for instance, through use of Intel® Software Guard Extensions (SGX) or ARM® Trust-Zone® hardware security extensions, Intel® Management Engine (ME), or Intel® Converged Security Manageability Engine (CSMF). Other aspects of security hardening, hardware roots-of-trust, and trusted or protected operations may be implemented in the user device 300 through the TEE 390 and the processor 352.

The secure environment may include hardware facilities, including a security component (SEC)—such as a trusted execution environment (TEE), hardware security module (HSM), software guard extension (SGX), trusted platform module (TPM), or the like. These facilities may store a key or other encryption or secure access information to perform encryption of data in memory (e.g., random access memory (RAM)), in storage (e.g., hard drive, solid state drive (SSD), storage class memory, etc.), on an interlink (e.g., bus), or the like.

The user device 300 may query a server or other device (e.g., the interface device 110 of FIG. 1) to request a segment or plurality of segments. The user device 300 may send identifiers for each segment requested. The user device 300 may receive requested segments. The user device 300 may then decrypt the requested segments, optionally within the secure environment 310. The user device 300 may recompile the decrypted segments to generate an executable application. In an example, the executable application is configured to execute only within the secure environment 310. In other examples, the executable application may be configured to execute in any environment.

Figure 4:
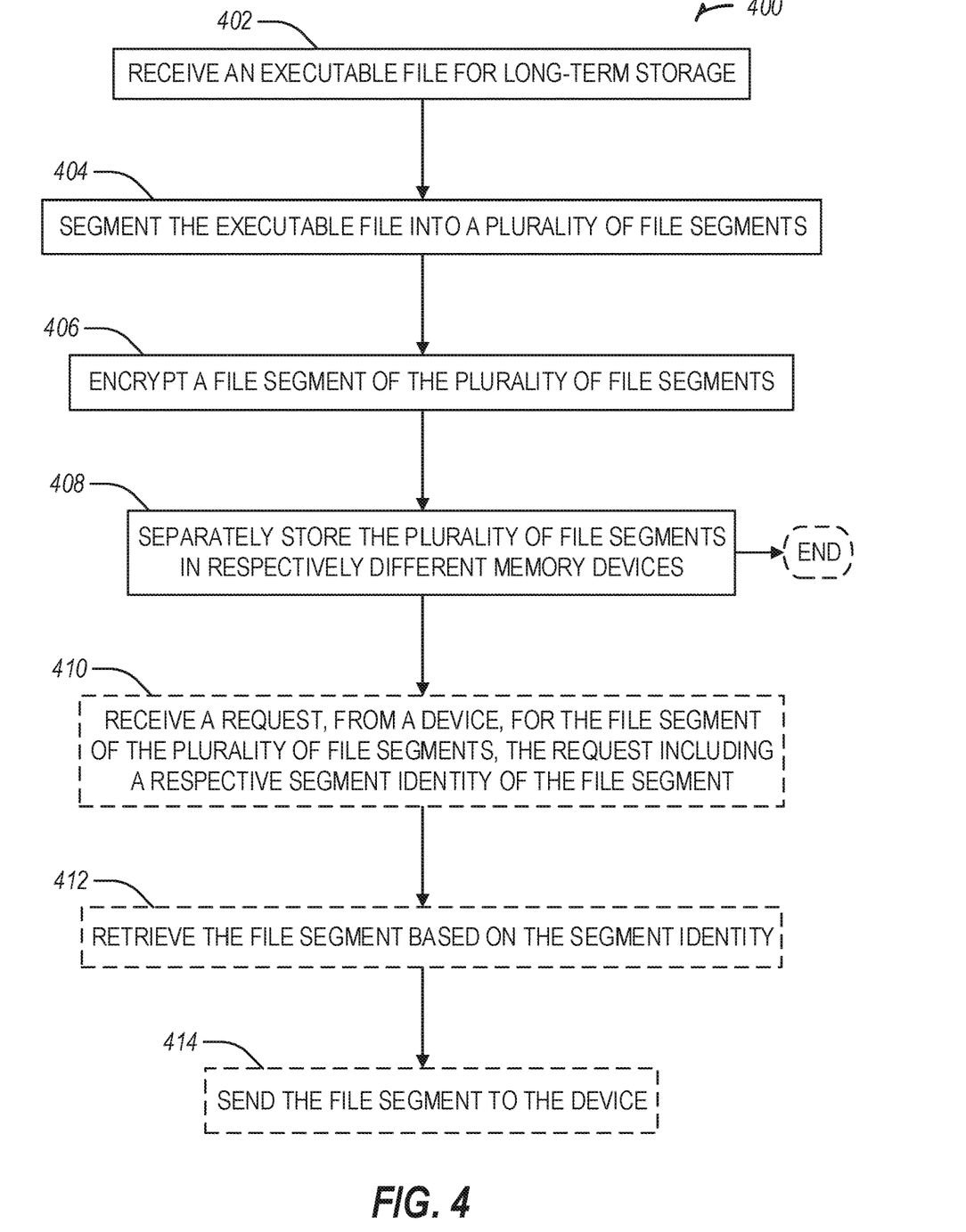
FIG. 4 illustrates a flowchart showing a technique for securely storing an executable file in accordance with some embodiments.

FIG. 4 illustrates a flowchart showing a technique 400 for securely storing an executable file in accordance with some embodiments. In an example, operations of the technique 400 may be performed by processing circuitry, for example by executing instructions stored in memory. The processing circuitry may include a processor, a system on a chip, or other circuitry (e.g., wiring).

The technique 400 includes an operation 402 to receive an executable file for long-term storage. In another example, operation 402 may receive another type of file. Long-term storage may include a particular time frame (e.g., days, weeks, months, years, at least a decade, etc.), an indefinite time frame (e.g., until an event occurs or in perpetuity), or may refer to storing on a medium other than a temporary storage medium (e.g., RAM).

The technique 400 includes an operation 404 to segment the executable file into a plurality of file segments. The file may be segmented into two or more segments. In an example, the executable file may be configured to be unexecutable without being compiled from al file segments of the plurality of file segments.

The technique 400 includes an operation 406 to encrypt a file segment of the plurality of file segments. Operation 406 may include encrypting two or more segments of the plurality of segments (e.g., all of the segments). The encryption used may vary among the segments encrypted. In an example, a single file segment may be encrypted with two or more encryption techniques (e.g., types, parameters, etc.). Operation 406 may include encrypting all file segments of the plurality of file segments using a homomorphic encryption technique.

The technique 400 includes an operation 408 to separately store the plurality of file segments in respectively different memory devices. Separately store may include storing at least one file segment on a first memory device and at least a second file segment on a second memory device. This operation may store segments on the same memory device as well. For example, with two segments of a file, each of the segments may be encrypted twice with two different encryption techniques. Then, both of the first segment may be stored on a first memory device and both of the second file segment may be stored on a second memory device. In another example, both segments encrypted with a first encryption technique may be stored on a first memory device and both segments encrypted with a second encryption technique may be stored on a second memory device.

In an example, a mapping of segment identities of the plurality of file segments to storage locations may be stored. Optionally, an encryption technique for the file segment may be stored in the map. In an example, when an encryption technique used to perform the encrypting has been broken, the technique 40 may include decrypting the file segment and re-encrypting the files segment using a different encryption technique (e.g., one not broken). In an example, an available stronger encryption technique may be identified for encrypting the at least one of the plurality of file segments. In response, the technique 400 may include decrypting the file segment, and re-encrypting the file segment using the stronger encryption technique. After operation 408, the technique 400 may end. In another example, the technique 410 may continue (e.g., at a later time) to operation 410.

The technique 400 includes an optional operation 410 to receive a request, from a device, for the file segment of the plurality of file segments, the request including a respective segment identity of the file segment. Optional operation 410 may occur at a later time (e.g., days, weeks, months, years later, etc.) or from a different device than the executable file is received (or from the same device the executable file is received). The request may include identifiers of all file segments, in an example. The map may be used to determine storage locations from identifiers.

The technique 400 includes an optional operation 412 to retrieve the file segment based on the segment identity. Optional operation 412 may include retrieving all file segments.

The technique 400 includes an optional operation 414 to send the file segment to the device. Optional operation 414 may include sending all file segments (e.g., separately or as a compiled file, such as a recompiled version of the executable file originally received). The segments or the file may be decrypted before sending or may remain encrypted when sent to the device. Optional operation 414 may include sending current encryption information for the file segment.

The technique 400 may include identifying a change in storage location of the file segment to a new storage location and in response, updating the mapping of the respective segment identity of the file segment to the new storage location. The technique 400 may include identifying that a storage location of the file segment is compromised, and in response changing a storage location of the file segment. The technique 400 may include encrypting a second file segment of the plurality of file segments with a second encryption technique that differs from a first encryption technique used to encrypt the file segment.

Figure 5:
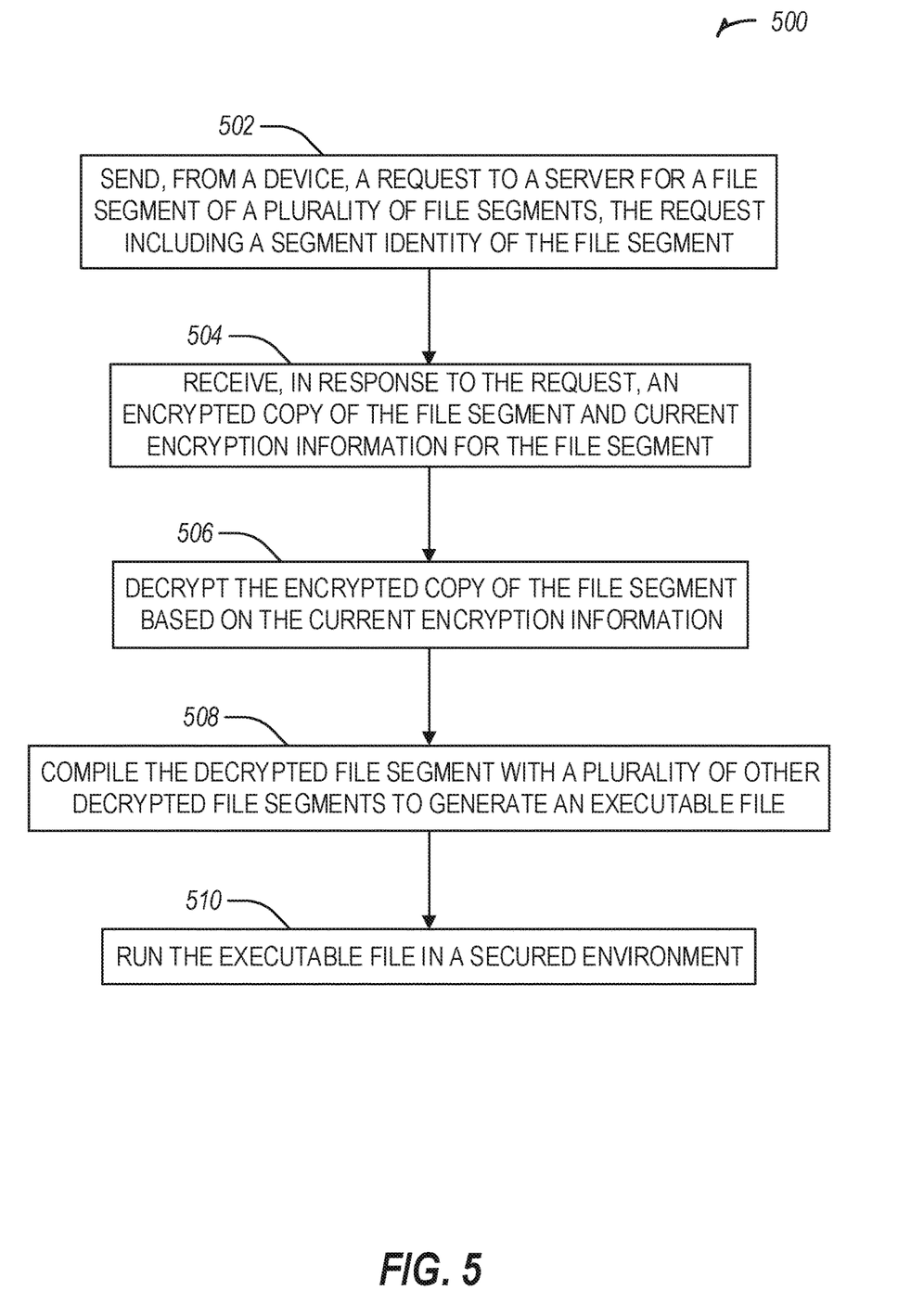
FIG. 5 illustrates a flowchart showing a technique for compiling a securely stored executable file in accordance with some embodiments.

FIG. 5 illustrates a flowchart showing a technique 500 for compiling a securely stored executable file in accordance with some embodiments. In an example, operations of the technique 500 may be performed by processing circuitry, for example by executing instructions stored in memory. The processing circuitry may include a processor, a system on a chip, or other circuitry (e.g., wiring).

The technique 500 includes an operation 502 to send, from a device, a request to a server for a file segment of a plurality of file segments, the request including a segment identity of the file segment. The segment identity may be mapped to a storage location or current encryption information, in a map stored at the receiving device, for example. The technique 500 includes an operation 504 to receive, in response to the request, an encrypted copy of the file segment and current encryption information for the file segment. The technique 500 includes an operation 506 to decrypt the encrypted copy of the file segment based on the current encryption information. The technique 500 includes an operation 508 to compile the decrypted file segment with a plurality of other decrypted file segments to generate a file, such as an executable file. The technique 500 includes an operation 510 to run the executable file, for example in a secured environment.

Figure 6:
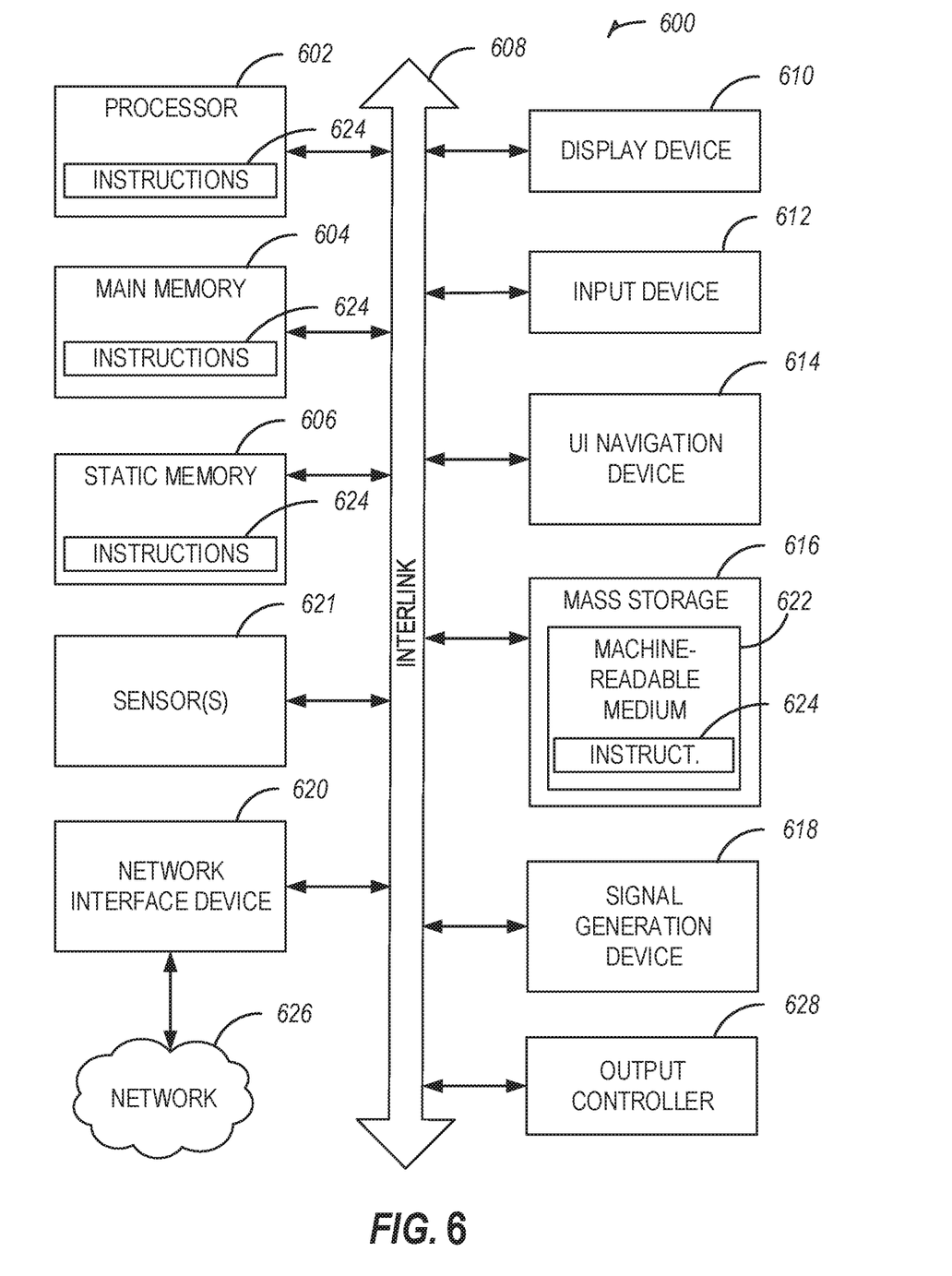
FIG. 6 illustrates generally an example of a block diagram of a machine upon which any one or more of the techniques discussed herein may perform in accordance with some embodiments.

FIG. 6 illustrates generally an example of a block diagram of a machine 600 upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Example 1 is a method of securely storing data comprising: receiving an executable file for long-term storage; segmenting the executable file into a plurality of file segments; encrypting a file segment of the plurality of file segments; separately storing the plurality of file segments in respectively different memory devices; and storing a mapping of segment identities of the plurality of file segments to storage locations.

In Example 2, the subject matter of Example 1 includes, identifying that an encryption technique used to perform the encrypting has been broken; decrypting the file segment; and re-encrypting the file segment using a different encryption technique.

In Example 3, the subject matter of Examples 1-2 includes, identifying that a stronger encryption technique is available for encrypting the at least one of the plurality of file segments; decrypting the file segment; and re-encrypting the file segment using the stronger encryption technique.

In Example 4, the subject matter of Examples 1-3 includes, identifying a change in storage location of the file segment to a new storage location and, in response, updating the mapping of the respective segment identity of the file segment to the new storage location.

In Example 5, the subject matter of Examples 1-4 includes, identifying that a storage location of the file segment is compromised, and, in response, changing a storage location of the file segment.

In Example 6, the subject matter of Examples 1-5 includes, encrypting a second file segment of the plurality of file segments with a second encryption technique that differs from a first encryption technique used to encrypt the file segment.

In Example 7, the subject matter of Examples 1-6 includes, wherein the executable file is configured to be unexecutable without being compiled from all file segments of the plurality of file segments.

In Example 8, the subject matter of Examples 1-7 includes, wherein encrypting the file segment includes encrypting all file segments of the plurality of file segments using a homomorphic encryption technique.

In Example 9, the subject matter of Examples 1-8 includes, receiving a request, from a device, for the file segment of the plurality of file segments, the request including a respective segment identity of the file segment; retrieving the file segment based on the mapping and the segment identity; and sending the file segment to the device.

In Example 10, the subject matter of Example 9 includes, wherein sending the file segment to the device includes sending current encryption information for the file segment.

Example 11 is a system of securely storing data comprising: processor circuitry; and memory, including instructions, which when executed by the processing circuitry, causes the processing circuitry to perform operations to: receive an executable file for long-term storage; segment the executable file into a plurality of file segments; encrypt a file segment of the plurality of file segments; separately send for storage, in respectively different memory devices, the plurality of file segments; and store, in the memory, a mapping of segment identities of the plurality of file segments to storage locations.

In Example 12, the subject matter of Example 11 includes, wherein the instructions further cause the processor to: identify that an encryption technique used to perform the encrypting has been broken; decrypt the file segment; and re-encrypt the file segment using a different encryption technique.

In Example 13, the subject matter of Examples 11-12 includes, wherein the instructions further cause the processor to: identify that a stronger encryption technique is available for encrypting the at least one of the plurality of file segments; decrypt the file segment; and re-encrypt the file segment using the stronger encryption technique.

In Example 14, the subject matter of Examples 11-13 includes, wherein the instructions further cause the processor to identify a change in storage location of the file segment to a new storage location and, in response, update the mapping of the respective segment identity of the file segment to the new storage location.

In Example 15, the subject matter of Examples 11-14 includes, wherein the instructions further cause the processor to identify that a storage location of the file segment is compromised, and, in response, change a storage location of the file segment.

In Example 16, the subject matter of Examples 11-15 includes, wherein the instructions further cause the processor to encrypt a second file segment of the plurality of file segments with a second encryption technique that differs from a first encryption technique used to encrypt the file segment.

In Example 17, the subject matter of Examples 11-16 includes, wherein the executable file is configured to be unexecutable without being compiled from all file segments of the plurality of file segments.

In Example 18, the subject matter of Examples 11-17 includes, wherein to encrypt the file segment, the instructions further cause the processor to encrypt all file segments of the plurality of file segments using a homomorphic encryption technique.

In Example 19, the subject matter of Examples 11-18 includes, wherein the instructions further cause the processor to: receive a request, from a device, for the file segment of the plurality of file segments, the request including a respective segment identity of the file segment; retrieve the file segment based on the mapping and the segment identity; and send the file segment to the device.

In Example 20, the subject matter of Example 19 includes, wherein to send the file segment to the device, the instructions further cause the processor to send current encryption information for the file segment.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method of securely storing data comprising:
   receiving an executable file for long-term storage;
   segmenting, at a server, the executable file into a plurality of file segments;
   encrypting a file segment of the plurality of file segments;
   separately storing the plurality of file segments in respectively different memory devices;
   generating, at the server, a mapping of segment identities of the plurality of file segments to storage locations, the mapping including the segment identities and the storage locations;
   storing the mapping of the segment identities of the plurality of file segments to the storage locations;
   sending, from the server to a device, information indicating a segment identity of the segment identities and a respective storage location from the mapping, the segment identity and the respective storage location corresponding to the file segment; and
   in response to a security breach at the respective storage location, moving the file segment corresponding to the segment identity from the respective storage location to a new storage location and updating the mapping to the new storage location.

2. The method of claim 1, further comprising:
   identifying that an encryption technique used to perform the encrypting has been broken;
   decrypting the file segment; and
   re-encrypting the file segment using a different encryption technique.

3. The method of claim 1, further comprising:
   identifying that a stronger encryption technique is available for encrypting the at least one of the plurality of file segments;
   decrypting the file segment; and
   re-encrypting the file segment using the stronger encryption technique.

4. The method of claim 1, in response to the security breach, storing the updated mapping.

5. The method of claim 1, further comprising encrypting a second file segment of the plurality of file segments with a second encryption technique that differs from a first encryption technique used to encrypt the file segment, and storing the first and second encryption techniques in the mapping at corresponding segment identities to the file segment and the second file segment, respectively.

6. The method of claim 1, wherein the executable file is configured to be unexecutable without being compiled from all file segments of the plurality of file segments.

7. The method of claim 1, wherein encrypting the file segment includes encrypting all file segments of the plurality of file segments using a homomorphic encryption technique.

8. The method of claim 1, further comprising:
   receiving a request, from a device, for the file segment of the plurality of file segments, the request including a respective segment identity of the file segment;
   retrieving the file segment based on the mapping and the segment identity; and
   sending the file segment to the device.

9. The method of claim 8, wherein sending the file segment to the device includes sending current encryption information for the file segment.

10. A system of securely storing data comprising:
    processor circuitry; and
    memory, including instructions, which when executed by the processing circuitry, causes the processing circuitry to perform operations to:
    receive an executable file for long-term storage;
    segment, at a server, the executable file into a plurality of file segments;
    encrypt a file segment of the plurality of file segments;
    separately send for storage, in respectively different memory devices, the plurality of file segments;
    segments;
    generate, at the server, a mapping of segment identities of the plurality of file segments to storage locations, the mapping including the segment identities and the storage locations;
    store, in the memory, the mapping of the segment identities of the plurality of file segments to the storage locations;
    send, from the server to a device, information indicating a segment identity of the segment identities and a respective storage location from the mapping, the segment identity and the respective storage location corresponding to the file segment; and
    move, in response to a security breach at the respective storage location, the file segment corresponding to the segment identity from the respective storage location to a new storage location and updating the mapping to the new storage location.

11. The system of claim 10, wherein the instructions further cause the processor to:
    identify that an encryption technique used to perform the encrypting has been broken;
    decrypt the file segment; and
    re-encrypt the file segment using a different encryption technique.

12. The system of claim 10, wherein the instructions further cause the processor to:

identify that a stronger encryption technique is available for encrypting the at least one of the plurality of file segments;

decrypt the file segment; and re-encrypt the file segment using the stronger encryption technique.

13. The system of claim 10, in response to the security breach, storing the updated mapping.

14. The system of claim 10, wherein the instructions further cause the processor to encrypt a second file segment of the plurality of file segments with a second encryption technique that differs from a first encryption technique used to encrypt the file segment, and cause the processor to store the first and second encryption techniques in the mapping at corresponding segment identities to the file segment and the second file segment, respectively.

15. The system of claim 10, wherein the executable file is configured to be unexecutable without being compiled from all file segments of the plurality of file segments.

16. The system of claim 10, wherein to encrypt the file segment, the instructions further cause the processor to encrypt all file segments of the plurality of file segments using a homomorphic encryption technique.

17. The system of claim 10, wherein the instructions further cause the processor to:

receive a request, from a device, for the file segment of the plurality of file segments, the request including a respective segment identity of the file segment;

retrieve the file segment based on the mapping and the segment identity; and send the file segment to the device.

18. The system of claim 17, wherein to send the file segment to the device, the instructions further cause the processor to send current encryption information for the file segment.

19. A method of securely storing data comprising:

receiving an executable file for long-term storage;

segmenting, at a server, the executable file into a plurality of file segments;

encrypting a file segment of the plurality of file segments;

separately storing the plurality of file segments in respectively different memory devices;

generating, at the server, a mapping of segment identities of the plurality of file segments to storage locations, the mapping including the segment identities and the storage locations;

storing the mapping of the segment identities of the plurality of file segments to the storage locations;

sending, from the server to a device, information indicating a segment identity of the segment identities and a respective storage location from the mapping, the segment identity and the respective storage location corresponding to the file segment; and in response to a fraudulent access at the respective storage location, moving a second file segment of the plurality of file segments corresponding to a second segment identity from the respective storage location to a new storage location and updating the mapping to the new storage location.

\* \* \* \* \*

UNITED STATES PATENT AND TRADEMARK OFFICE
CERTIFICATE OF CORRECTION

PATENT NO. : 11,763,038 B2  
APPLICATION NO. : 16/858115  
DATED : September 19, 2023  
INVENTOR(S) : Kalaboukis et al.

Page 1 of 1

It is certified that error appears in the above-identified patent and that said Letters Patent is hereby corrected as shown below:

In the Claims

In Column 14, Lines 40-41, in Claim 10, after "segments;¶", delete "segments;"

Signed and Sealed this
Fourteenth Day of November, 2023

Katherine Kelly Vidal
*Director of the United States Patent and Trademark Office*